Patented June 16, 1953

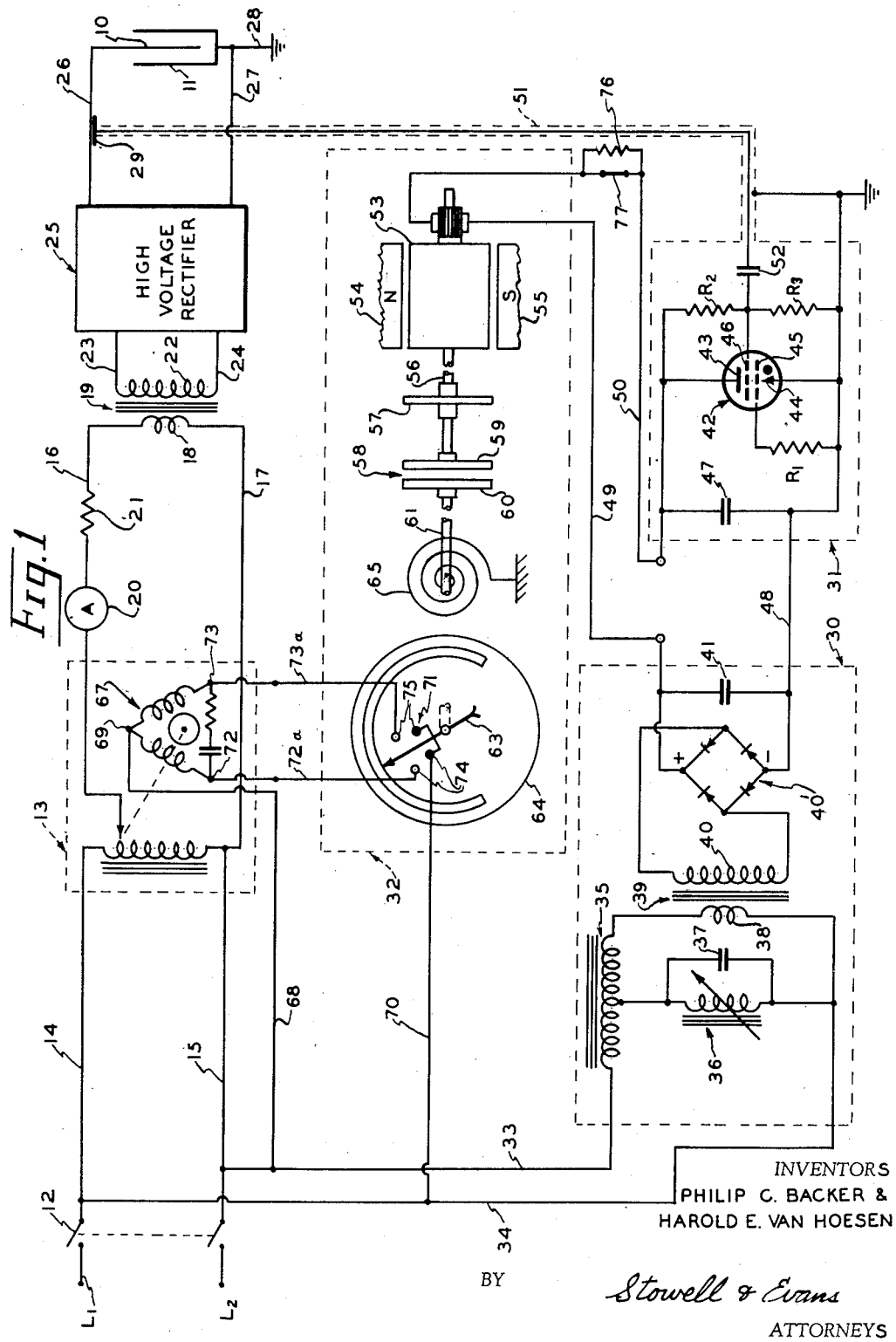

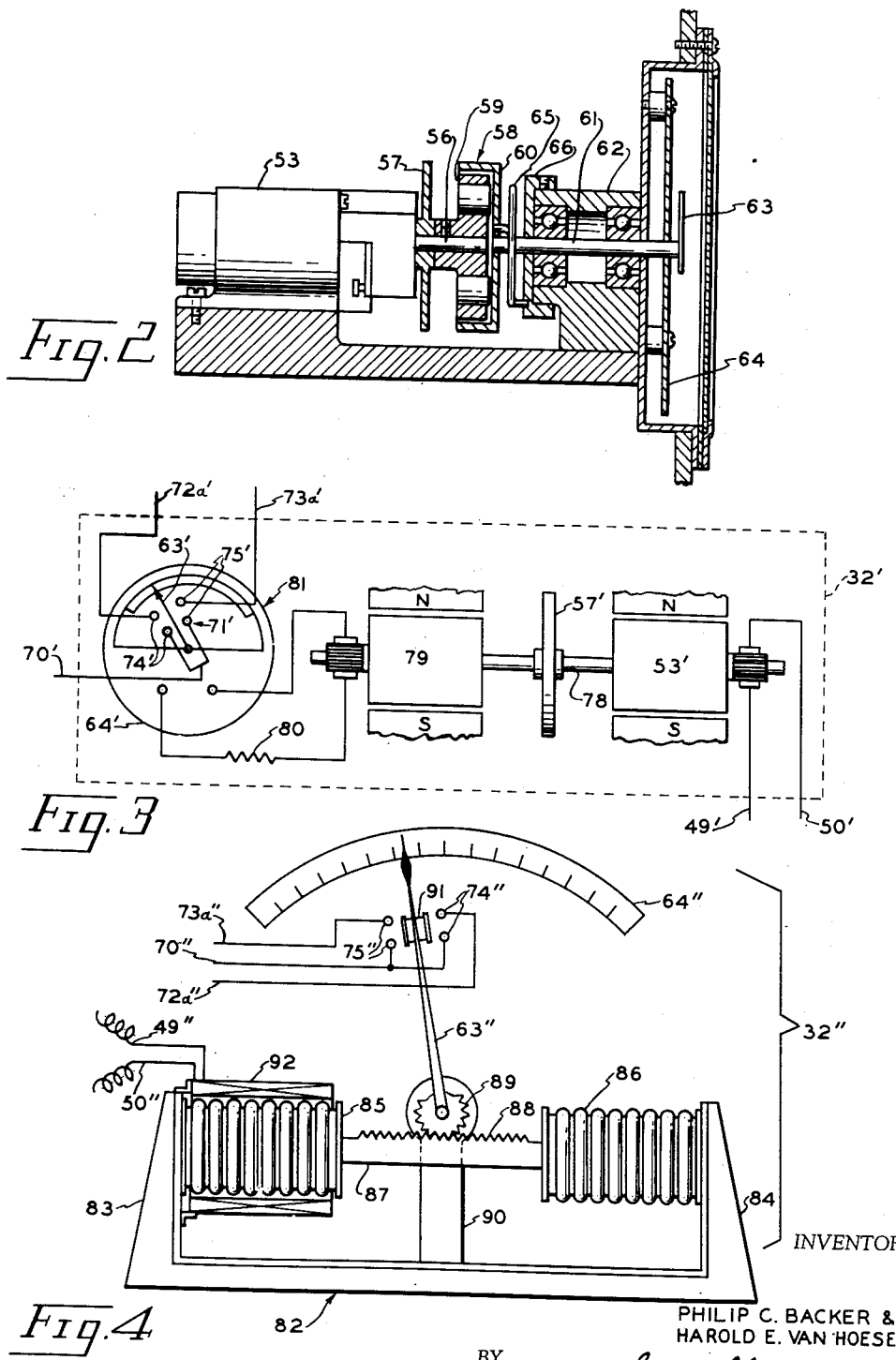

2,642,149

UNITED STATES PATENT OFFICE 2,642,149

SYSTEM FOR ENERGIZING ELECTRICAL PRECIPITATORS AND THE LIKE

Philip C. Backer, Middlesex, and Harold E. Van Hoesen, South Branch, N. J., assignors to Research Corporation, New York, N. Y., a corporation of New York Application July 30, 1951, Serial No. 239,344

10 Claims. (Cl. 183—7)

This invention relates to systems for energizing electrical precipitators and the like and more particularly to a system for regulating the voltage applied to the electrodes of electrical precipitators.

In the operation of electrical precipitators of the Cottrell type, sparking takes place between the discharge and collecting electrodes. The efficiency of the precipitator depends in major part upon the rate of sparking. Efficiency increases with sparking rate to a certain optimum point beyond which a further increase in sparking rate brings about a decrease in efficiency.

An object of the invention is to provide a system for automatically controlling the operation of an electrical precipitator to maintain the conditions of operation at or about the point of optimum sparking rate.

Another object is to provide a system for controlling the voltage applied to the precipitator electrodes in accordance with the absolute value of the sparking rate.

Another object is to provide a system of the foregoing type that is simple and economical to construct and install and that operates with a minimum of supervision and maintenance.

These and other objects of the invention are achieved in a system for energizing the electrodes of an electrical precipitator including means for varying the voltage applied to the electrodes, a device responsive to disturbances in the system caused by an inter-electrode spark, means for generating current pulses in accordance with the responses of the spark responsive device, motor means actuated by said pulses to generate a force varying with the rate of the pulses, a control device operatively connected to the voltage varying means, and means transmitting the force developed by the motor means to the control device to vary the control action thereof in accordance with the rate of the pulses.

The invention is described with greater particularity and other of its aims and advantages are set forth in or will be apparent from the following detailed description with reference to the drawings in which:

Fig. 1 is a diagrammatic view of one form of precipitator energizing system embodying the principles of the invention;

Fig. 2 is an axial sectional view of a motor and control device as employed in the system of Fig. 1;

Fig. 3 is a diagrammatic view of another form of motor and control device that may be used alternatively to the device of Fig. 2; and Fig. 4 is a view of still another alternative form of motor and control device.

Referring to the drawings, particularly to Fig. 1 thereof, the system shown includes an electrical precipitator having a discharge electrode 10 and a complementary grounded extended surface or collecting electrode 11. The electrodes of the precipitator are energized from an alternating current line $L_1$—$L_2$, typically a line carrying 60 cycle current of 220 or 440 volts. A main switch 12, when closed, energizes a voltage varying transformer designated by the general reference numeral 13 through conductors 14 and 15. The output of the voltage varying transformer 13 is conducted through wires 16 and 17 to the primary winding 18 of a step-up power transformer 19. An ammeter 20 and surge resistor 21 may be included in the input conductor of the transformer 19. The output from the secondary winding 22 of the power transformer, that may have a voltage of the order of 50,000 volts, is fed through wires 23 and 24 to a conventional high voltage rectifier 25. The direct current output from rectifier 25 is applied to the electrodes of the electrical precipitator through cables 26 and 27. The high voltage side of the precipitator energizing system is grounded in conventional manner at 28.

The control system of the present invention includes the following principal components: (a) a spark-responsive device 29; (b) a circuit for generating current pulses in accordance with the responses of the spark-sensing device including a power pack 30 and an electron tube relay 31; and (c) a motor and control device 32.

Power pack 30 provides unidirectional current of regulated voltage for operation of the control system. For this purpose alternating current from the line $L_1$—$L_2$ is fed to the power pack 30 through wires 33 and 34. The alternating current is applied to a conventional voltage regulating circuit for the purpose of providing current of substantially constant voltage notwithstanding normal fluctuations of the line voltage. The voltage regulator includes a tapped cored inductor 35 and a shunt network including a variable cored inductor 36 and parallel capacitor 37. Any suitable voltage regulator may be employed.

Regulated alternating current is applied to the primary winding 38 of a power transformer 39 and alternating current from the secondary winding 40 is rectified in the selenium bridge rectifier 40'. Obviously, any other conventional and suitable rectifier may be used instead of the one shown by way of illustration.

The rectified output of the rectifier 40' is applied to a pulsing condenser 41.

The electron tube relay 31 includes a strobotron tube 42, being a gas filled tube having an anode 43, a cathode 44 and two grids 45 and 46. Resistors R1, R2 and R3 provide requisite bias for the grids 45 and 46. A firing condenser 47 is connected across the anode and cathode terminals of the strobotron tube. The tube is energized by current from the power pack 30 through a wire 48 connected from the negative terminal of the power pack to the tube cathode and a second conductive path from the positive terminal of the power pack to the tube anode; the latter path including the wires 49 and 50.

Pulses or disturbances occasioned by an inter-electrode spark are sensed by the pick-up 29 capacitively related to the high tension power cable 26. The signal generated in the pick-up is applied to the second or control grid 46 of the strobotron tube through the shielded wire 51 and coupling condenser 52. The pick-up 29 may be of any other convenient type and may be positioned at any suitable point in the energizing system where it will sense disturbances caused by an inter-electrode spark.

For each impulse applied to the control grid of tube 42, the tube fires and then extinguishes upon discharge of the firing condenser 47. The firing condenser is immediately recharged for repetition of the cycle from the power pack, including the pulse condenser 41, through the rotor winding of a direct current motor 53 forming a component of the motor and control device assembly 32. It will be understood that other tubes such as a thyratron may be used instead of the strobotron 42. Motor 53 is of a known type and may have permanent field magnets 54 and 55; the motor is so designed that the rotational speed imparted to the rotor is a function of the rate of the pulses and such speed may be directly proportional to the pulse rate.

The motor and control device assembly 32 is shown in axial section in Fig. 2. Motor 53 has a shaft 56 carrying a flywheel 57 providing an inertia member that tends to smooth or average the speed of the motor where the driving pulses are irregular. The shaft works through a drag coupling device 58, specifically a magnetic coupling having an impeller 59 and a follower 60, to rotate the follower shaft 61. Other drag coupling devices such as a fluid clutch may be employed instead of the magnetic coupling. The follower shaft is journalled in a bearing block 62 and carries a hand or indicator 63 rotating over a dial 64 that may be graduated to read the sparking rate directly. The follower shaft 61 is biased by a spiral spring 65 engaging the follower 60 at the inner end of the spring and engaging a collar 66 at the outer end of the spring. The collar 66 is rotatably adjustable on the bearing block 62, whereby tension in the spring is varied for calibration purposes. The spring applies to the follower 60 and shaft 61 a torque that opposes the torque applied by the impeller 59, and the hand 63 will arrive at an equilibrium position dependent upon the force received from the magnetic coupling impeller.

Referring to Fig. 1, the voltage varying transformer 13 is operated to raise and lower the output voltage by a reversible motor 67 powered by alternating current from the line L1—L2. Wire 68 conducts current from one side of the line to the common input terminal 69 of the reversible motor. Current from the other side of the line is conducted through a wire 70 and a switch 71 to either the "raise voltage" motor terminal 72 through the wire 72a or the "lower voltage" motor terminal 73 through the wire 73a. Switch 71 includes a pair of "raise voltage" contacts 74 and a pair of "lower voltage" contacts 75, which contacts are closed by the indicator hand 63 to energize the reversible motor 67 in the direction called for by the position of the hand.

As seen in Fig. 1, the pulse circuit that drives the motor 53 has a resistor 76 that may be put in series with the motor by removing the parallel link 77. This may be done where a plurality of precipitators is energized by one energizing circuit controlled by one control system that is sensitive to sparking in the plurality of precipitators; the resistor compensates for the increased rate of sparking occasioned by the plurality of precipitators, each of which is operated at the optimum sparking rate.

Operation of the system will be described with reference to Fig. 1. Switch 12 is closed and the voltage varying transformer 13 is adjusted to provide approximately the desired optimum operating conditions for the electrical precipitator. If, for example, the desired operating conditions require approximately 100 sparks per minute in the precipitator, the transformer 13 is set to provide this sparking rate. The sparks are sensed by the capacitive pick-up 29 and the strobotron 42 is fired in response to the spark disturbances. Electrical pulses corresponding in rate to the sparking rate are impressed on the motor 53 which, in turn, rotates at a corresponding speed. The indicator hand 63 is rotated through the drag coupling 58 to an equilibrium position corresponding to the sparking rate. This equilibrium position is between the two sets of contacts 74 and 75 as shown in Fig. 1 if the sparking rate is optimum.

Should the sparking rate drop below optimum value, the hand 63 will fall to a position to close contacts 74. The reversible motor 67 is actuated in a direction to raise the voltage on the precipitator electrodes 10 and 11 to a point where sparking rate is raised to approximately optimum value. Conversely, should the sparking rate rise above the optimum rate, contacts 75 will be closed by the hand 63 and the reversible motor 67 will operate to lower the inter-electrode voltage and reduce the sparking rate. Thus, the sparking rate is automatically held at or about the optimum point.

In Fig. 3 is shown an alternative form of motor and control device assembly designated by the general reference numeral 32'. This assembly may be substituted for the corresponding assembly 32 in the system of Fig. 1. In Fig. 3, those parts that correspond to parts in the assembly 32 of Fig. 1 are designated by corresponding primed reference numerals.

The direct current motor 53' receives energizing pulses corresponding to sparking rate through the wires 49' and 50'. The motor shaft 78, having the flywheel 57', drives a direct current generator 79, the output of which has an electromotive force corresponding to sparking rate in the precipitator under control. The output circuit of the generator 79 includes a load risistor 80 and an ammeter 81 having the usual D'Arsonval movement with a spring biasing the indicator hand 63' to zero reading. Current flowing in the generator output circuit corresponds to sparking rate. The dial 64' may be graduated in terms of sparking rate. Switch 71' corresponds to switch 71 of Fig. 1 and controls the action of the reversible motor for varying the energizing voltage applied to the electrodes of the precipitator.

Operation of a control system including the assembly of Fig. 3 will be readily understood from the description given hereinbefore of the operation of the system of Fig. 1. At optimum sparking rate, the ammeter hand 63' assumes a position intermediate the contacts 74' and 75'. As sparking rate increases from optimum, the hand 63' moves to close contacts 75' and the inter-electrode voltage is lowered. As sparking rate decreases from optimum, the hand closes contacts 74' to increase the inter-electrode voltage and thus to restore optimum operating conditions.

Referring to Fig. 4 the motor and control device assembly 32'' shown is an alternative to and may be substituted for either of the corresponding assemblies 32 of Fig. 1 or 32' of Fig. 3. Corresponding parts in Fig. 4 are given double-primed reference numerals corresponding to the numerals designating similar parts of the devices of Figs. 1 and 3. The assembly has a frame 82 including a pair of upstanding end members 83 and 84. A metallic sylphon bellows 85, that is hermetically sealed and contains a gas, such as air, has its base mounted on one of the frame arms 83 and is free to flex towards and away from the opposite frame member 84. A similar bellows 85 is similarly mounted on the frame member 84 in opposition to the first bellows. The opposed free ends of the bellows are linked together by a rigid strut 87 that is welded or otherwise affixed to the ends of the bellows. Thus, when the free end of bellows 85 moves to the right, the strut 87 forces the free end of bellows 86 to the right, and vice versa. Strut 87 has a rack 88 formed in its upper surface that meshes with a pinion 89 pivotally mounted on the upright 90 carried by the frame 82. The pinion 89 carries an indicating hand 63'' that sweeps over a dial 64''. The hand 63'' carries a contact member 91 capable of closing contacts 74'' or 75'' as the hand moves across the dial.

A resistance heating element in the form of a coil of wire 92 is mounted on the upright member 83 surrounding but spaced from the bellows 85. Terminal wires 49'' and 50'' are provided for the heating coil.

In operation, current pulses corresponding to the rate of sparking in the precipitator under control are supplied to the heating coil 92 through the wires 49'' and 50''. An elevated equilibrium temperature is achieved in the heating coil and bellows 85 that depends upon rate of precipitator sparking; higher rates of sparking produce higher temperatures. The bellows 85 thus expands to a degree dependent upon the temperature and correspondingly moves the rack 87 against the force of the compensating bellows 86. The hand 63'' is thus moved to a position on the dial 64'' corresponding to sparking rate.

The device of Fig. 4 is substantially independent of ambient temperature within normal atmospheric temperature ranges. Bellows 85 and 86 are substantially identical and are opposed to each other. Since they are equally affected by changes in ambient temperature, the ambient temperature effects are cancelled.

When the frequency of pulses applied to the heating coil 92 corresponds to optimum frequency of precipitator sparking, the hand 63'' assumes an equilibrium position between the contacts 74'' and 75''. When the sparking rate increases, the bellows 85 becomes hotter and the hand 63'' is moved counterclockwise to effect closing of contacts 75'' to lower precipitator voltage. Similarly, a decrease in sparking rate results in a lowering of the temperature of bellows 85, a clockwise movement of hand 63'' and the closure of contacts 74'' to lower the precipitator voltage.

We claim:

1. A system for energizing the electrodes of an electrical precipitator comprising means for varying the voltage applied to said electrodes, a device responsive to disturbances in the system caused by an inter-electrode spark, means for generating current pulses in accordance with the responses of said spark responsive device, motor means actuated by said pulses to generate a force varying with the rate of said pulses, a control device operatively connected to said voltage varying means, and means transmitting the force developed by said motor means to said control device to vary the control action thereof in accordance with the rate of said pulses.

2. A system as defined in claim 1 including an inertia member associated with said motor means smoothing the response of said motor means to said actuating pulses.

3. A system as defined in claim 2 wherein said motor means includes a rotary output shaft and said inertia member is a flywheel mounted on said shaft.

4. A system for energizing the electrodes of an electrical precipitator comprising means for varying the voltage applied to said electrodes, a device responsive to disturbances in the system caused by an inter-electrode spark, means for generating current pulses in accordance with the responses of said spark responsive device, motor means actuated by said pulses to generate a force varying with the rate of the pulses, a control device operatively connected to said voltage varying means, said control device having a member movable to vary the voltage of said voltage varying means, means applying a biasing force to said movable member, and means transmitting the force developed by said motor means to said movable member counter to said biasing force.

5. A system for energizing the electrodes of an electrical precipitator comprising means for varying the voltage applied to said electrodes, a device responsive to disturbances in the system caused by an inter-electrode spark, means for generating unidirectional current pulses in accordance with the responses of said spark responsive device, a direct current motor having a rotary output shaft, circuit means energizing said motor with said current pulses, a control device operatively connected to said voltage varying means, said control device having a rotary member movable to vary the voltage of said voltage varying means, means supplying a biasing torque to said rotary member, and means including a drag coupling connecting the output shaft of said motor to said rotary member to impart a torque to said rotary member counter to said biasing torque.

6. A system as defined in claim 5 wherein said drag coupling is a magnetic coupling.

7. A system for energizing the electrodes of an electrical precipitator comprising means for varying the voltage applied to said electrodes, a device responsive to disturbances in the system caused by an inter-electrode spark, means for generating unidirectional current pulses in accordance with the responses of said spark responsive device, a direct current motor having a rotary output shaft, circuit means energizing said motor with said current pulses, a control device operatively connected to said voltage varying means, said control device having a rotary member movable to vary the voltage of said voltage varying means, means supplying a biasing torque to said rotary member, an electric current generator driven by the output shaft of said motor, and means actuated by the output current of said generator to impart a torque to said rotary member counter to said biasing torque.

8. A system as defined in claim 7 wherein said control device comprises an ammeter the movable hand of which provides said movable member.

9. A system for energizing the electrodes of an electrical precipitator comprising means for varying the voltage applied to said electrodes, a device responsive to disturbances in the system caused by an inter-electrode spark, means for generating current pulses in accordance with the responses of said spark responsive device, a control device operatively connected to said voltage varying means, said control device including a frame, a sealed gas-filled first bellows mounted on said frame for reciprocation with changes in temperature, a sealed gas-filled second bellows mounted on said frame for reciprocation in a sense opposite to that of said first bellows with changes in temperature, linkage means connecting said bellows in opposition, an electric heating element in heat exchange relation with one of said bellows, means energizing said heating element with said current pulses, and means responsive to movement of said linkage means to vary the voltage of said voltage varying means.

10. An electrical precipitator system, including precipitator electrodes, regulable means for supplying high voltage to said electrodes, a device responsive to disturbances in said system caused by an inter-electrode spark for generating an individual current pulse of constant value in accordance with each such individual disturbance, motor means actuated by said pulses to develop a force varying with the rate of said pulses, inertia means associated with said motor means for averaging the force output thereof over a period determined by the effective value of said inertia means, a control device actuated by said motor means and operatively connected to said regulable means to vary the voltage output in accordance with the position of said control device, biasing means operatively associated with said control device to bias same in one direction, and means actuated by said motor means to oppose said biasing means with the force developed by the motor.

PHILIP C. BACKER.
HAROLD E. VAN HOESEN.

References Cited in the file of this patent

UNITED STATES PATENTS

| Number | Name | Date |
|---|---|---|
| 1,976,569 | Levy | Oct. 9, 1934 |
| 2,297,740 | Brown | Oct. 6, 1942 |
| 2,297,841 | MacKenzie | Oct. 6, 1942 |

FOREIGN PATENTS

| Number | Country | Date |
|---|---|---|
| 371,859 | Great Britain | Apr. 22, 1932 |
| 670,245 | Germany | Jan. 14, 1939 |